(No Model.)
J. B. F. HERRESHOFF.
PROCESS OF CONCENTRATING SULPHURIC ACID.
No. 357,528. Patented Feb. 8, 1887.
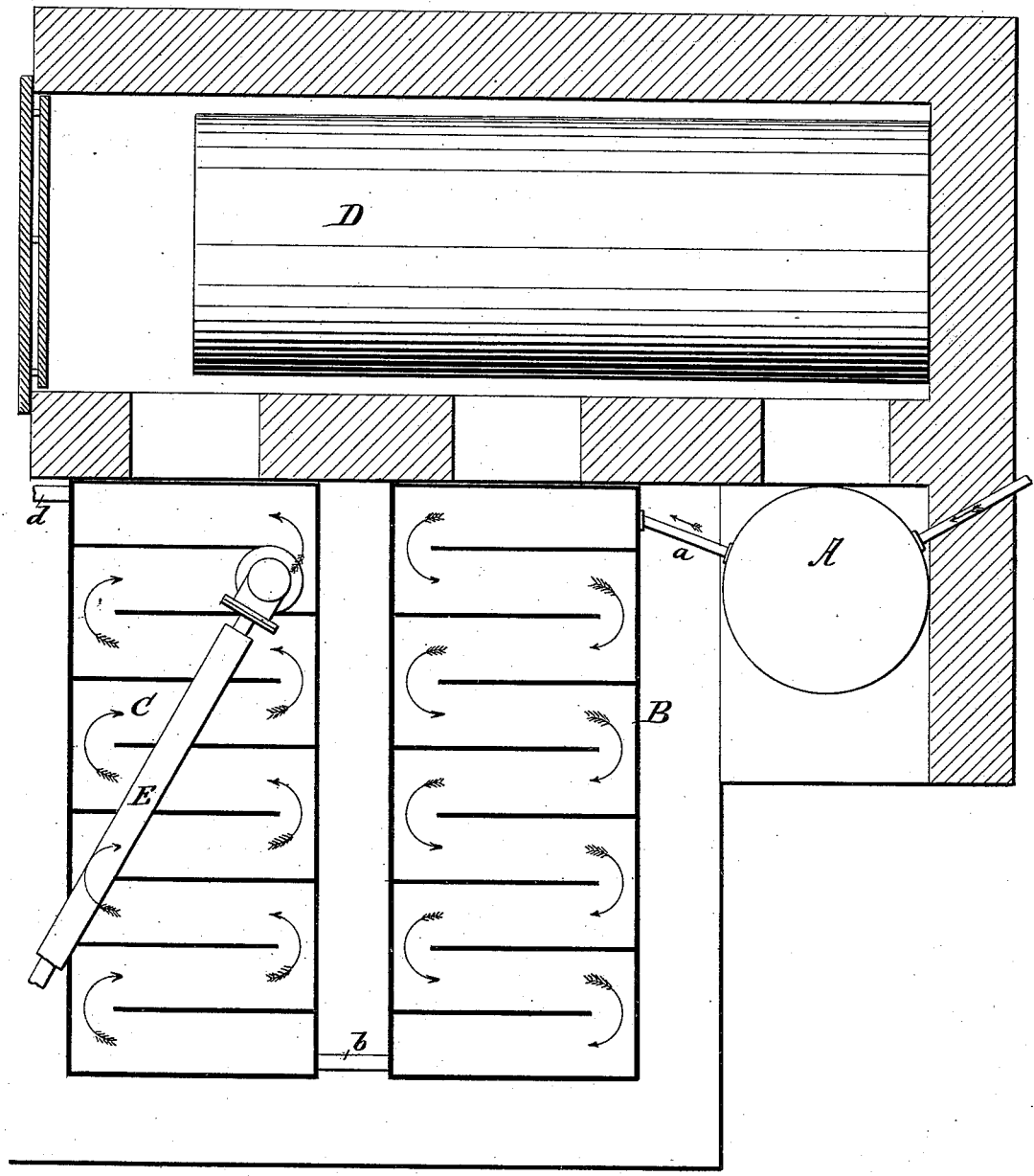
WITNESSES:
John M. Speer
Gustav Schneppé
INVENTOR
J. B. F. Herreshoff
BY Briesen & Steele
ATTORNEYS.

UNITED STATES PATENT OFFICE.

JOHN B. F. HERRESHOFF, OF BROOKLYN, NEW YORK, ASSIGNOR TO HIMSELF, GEORGE H. NICHOLS, AND WILLIAM H. NICHOLS, ALL OF SAME PLACE.

PROCESS OF CONCENTRATING SULPHURIC ACID.

SPECIFICATION forming part of Letters Patent No. 357,528, dated February 8, 1887.

Application filed May 17, 1886. Serial No. 202,404. (No specimens.)

*To all whom it may concern:*

Be it known that I, JOHN BROWN FRANCIS HERRESHOFF, a resident of Brooklyn, in the county of Kings and State of New York, have invented an Improved Process of Making Pure Sulphuric Acid and Strong Sulphuric Acid in one Continuous Operation, of which the following is a full, clear, and exact description, reference being made to the accompanying drawing, which represents a plan of the apparatus used in my new process.

This invention relates to a new process for converting crude sulphuric acid into two products in one operation, namely: first, pure sulphuric acid having the requisite standard strength of 93.5 per cent., and, secondly, strong, but not pure, sulphuric acid having a strength of about ninety-eight per cent. hydrated sulphuric acid $H_2SO_4$.

In carrying my process into effect I first take sulphuric acid, such as is ordinarily produced, and concentrate it up to about eighty-six per cent. $H_2SO_4$ in a suitable concentrator, A. From this concentrator the said sulphuric acid is directed by a pipe, $a$, into a vessel, B, in which the liquid flows to the discharge-pipe $b$ in a tortuous or other course, the said vessel being meanwhile exposed to heat to such an extent as to further concentrate the acid it contains to about ninety-five or ninety-six per cent. $H_2SO_4$. The acid having this strength is now carried by the pipe $b$ into a special vessel, C, wherein it runs in a tortuous or other course to the final discharge-pipe $d$. The vessel C is also exposed to direct heat, the waste heat then passing under steam-boiler D, or otherwise, which heat is so regulated as to drive off about one-half to two-thirds of the acid within the vessel C in the form of vapor. This vapor is then collected in a suitable condenser, E, and on condensing it will be found to be sulphuric acid of 93.5 per cent. $H_2SO_4$ strength (or 66° Baumé) of great purity. That much of the acid in the vessel C which is not distilled is concentrated by the evaporating process to a strength of about ninety-eight per cent. $H_2SO_4$, at which strength it leaves the vessel C through the pipe $d$. The amount or proportion of pure acid produced from the contents of the vessel C by distillation depends entirely on the strength of the acid that enters said vessel through the pipe $b$. Thus acid entering the vessel C at a strength of 93.5 per cent., in order to yield a distillate of the same strength, would obviously all have to be distilled. Therefore I prefer to feed the acid into the vessel C at a strength of about ninety-five to ninety-six per cent. $H_2SO_4$, which will allow about one half to be distilled into pure acid and the remaining half to be concentrated into strong acid.

In the ordinary way of concentrating acid up to ninety-seven or ninety-eight per cent. $H_2SO_4$ the distillates are not carried higher than seventy-five to eighty-five per cent. $H_2SO_4$, and more often only to fifty or sixty per cent. $H_2SO_4$, the aim being to get the strongest possible acid with the smallest and weakest possible distillate. All of this weak distillate has to be heated and distilled again in order to bring it up to a commercial product, and as the total of acid in these distillates represents only a small percentage of the entire output, the same is at once mixed with the more impure acid coming from the chambers, and no attempt made to make from them a purer commercial product.

In my process the fuel for heating and distilling a second time is saved.

I regard it as the most important part of my present invention that by one continuous process I obtain a concentrated product of ninety-eight per cent. $H_2SO_4$ and an extremely pure acid of 93.5 per cent. $H_2SO_4$. Practically the principal advantage of my invention is that I am enabled to make pure acid from substances which heretofore have only yielded impure acid, and to dispense with the necessity of using the more expensive methods which thus far have been deemed needful for the production of a pure acid.

I claim—

The process herein described of treating sulphuric acid, which process consists in first concentrating the acid to about eighty-six per cent. $H_2SO_4$, in then concentrating it in a separate vessel to about ninety-five per cent. $H_2SO_4$, or certainly over 93.5 per cent. $H_2SO_4$, and in finally evaporating this concentrated acid in another vessel, so as to produce from the residue strong acid of ninety-eight per cent. $H_2SO_4$, and condensing the vaporized acid from the last-mentioned vessel, so as to produce a pure acid of 93.5 per cent. $H_2SO_4$, substantially as hereinbefore described.

J. B. F. HERRESHOFF.

Witnesses:
FRANK BURBIDGE,
C. H. JOUET.